United States Patent [19]
Meek

[11] Patent Number: 5,414,938
[45] Date of Patent: May 16, 1995

[54] PORTABLE TEMPLET AND METHOD THEREFOR

[76] Inventor: Donald G. Meek, 6168 W. Cherry Lynn, Phoenix, Ariz. 85033

[21] Appl. No.: 137,587

[22] Filed: Oct. 15, 1993

[51] Int. Cl.6 .............................................. B43L 7/10
[52] U.S. Cl. ...................................... 33/452; 33/456; 33/464; 33/500
[58] Field of Search ................. 33/452, 456, 459, 460, 33/463, 464, 469, 495, 496, 497, 498, 499, 500, DIG. 1, 415, 416, 417

[56] References Cited

U.S. PATENT DOCUMENTS

| 1,640,604 | 8/1927 | Hauber | 33/463 |
| 1,906,988 | 5/1933 | McFarland | 33/456 |
| 2,206,760 | 7/1940 | Ballard | 33/456 |
| 2,382,618 | 8/1945 | Douglass | 33/456 |

FOREIGN PATENT DOCUMENTS

| 1170101 | 1/1959 | France | 33/456 |
| 1294691 | 12/1962 | France | 33/DIG. 1 |
| 8998 | 8/1879 | Germany | 33/452 |
| 87582 | 4/1921 | Switzerland | 33/452 |
| 8599 | 6/1888 | United Kingdom | 33/469 |
| 168894 | 7/1965 | U.S.S.R. | 33/456 |

*Primary Examiner*—Christopher W. Fulton
*Attorney, Agent, or Firm*—Harry M. Weiss

[57] ABSTRACT

An end of a rectangular scaled straight edge is pivotally connected to an end of a rectangular unscaled straight edge. The scaled straight edge has a longitudinal slot wherein a stem is retained by a compression lock. The stem passes through a hole in one end of a flat connecting bar that is disposed between a bearing of the compression lock and the scaled straight edge. The other end of the connecting bar is pivotally connected to the unscaled straight edge. When the lock is open, the stem is slidable within the slot, thereby providing an adjustable angle between the straight edges. When the lock is closed, the position of the stem is fixed within the slot, thereby sustaining a fixed angle between the straight edges.

9 Claims, 2 Drawing Sheets

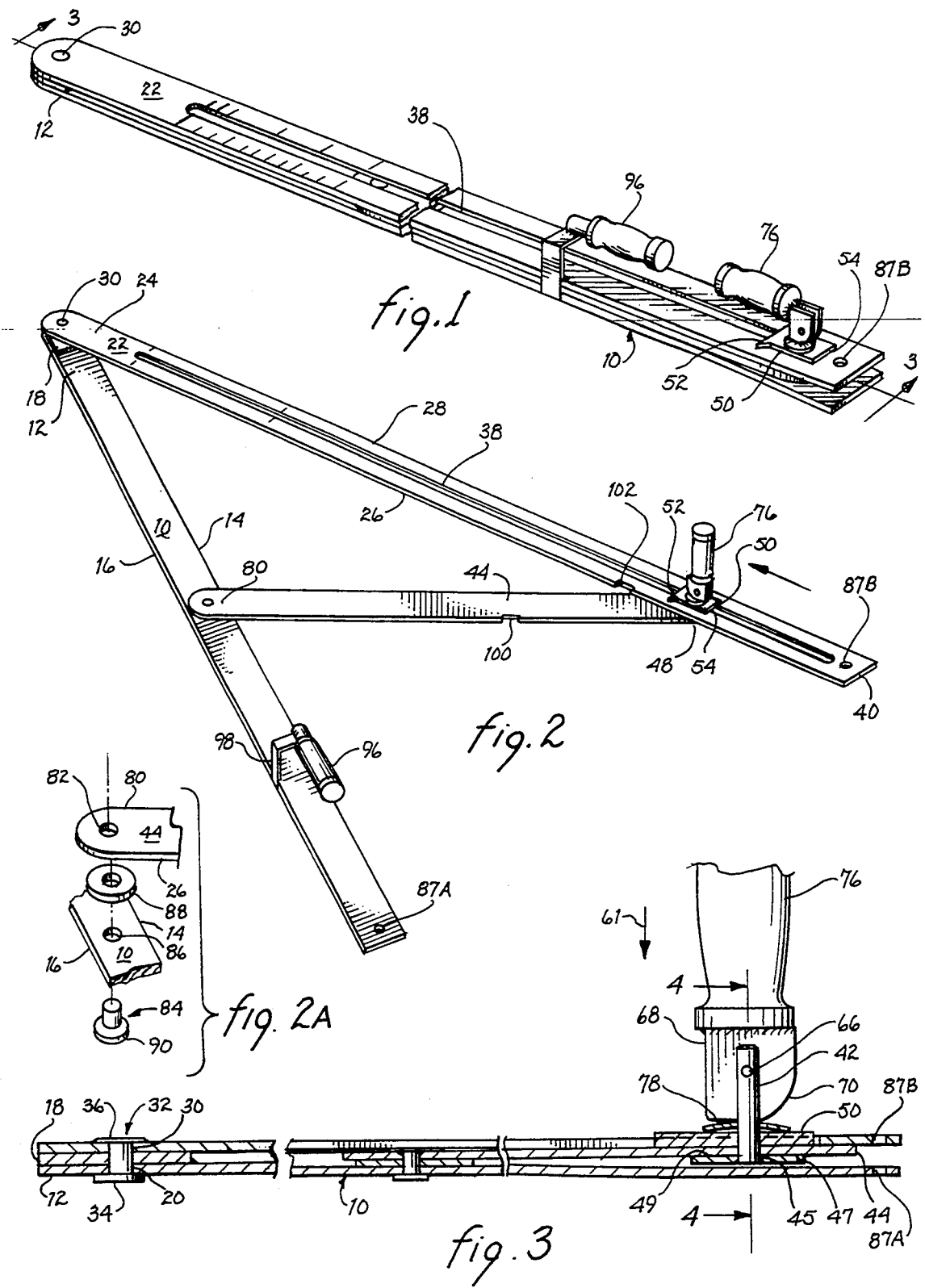

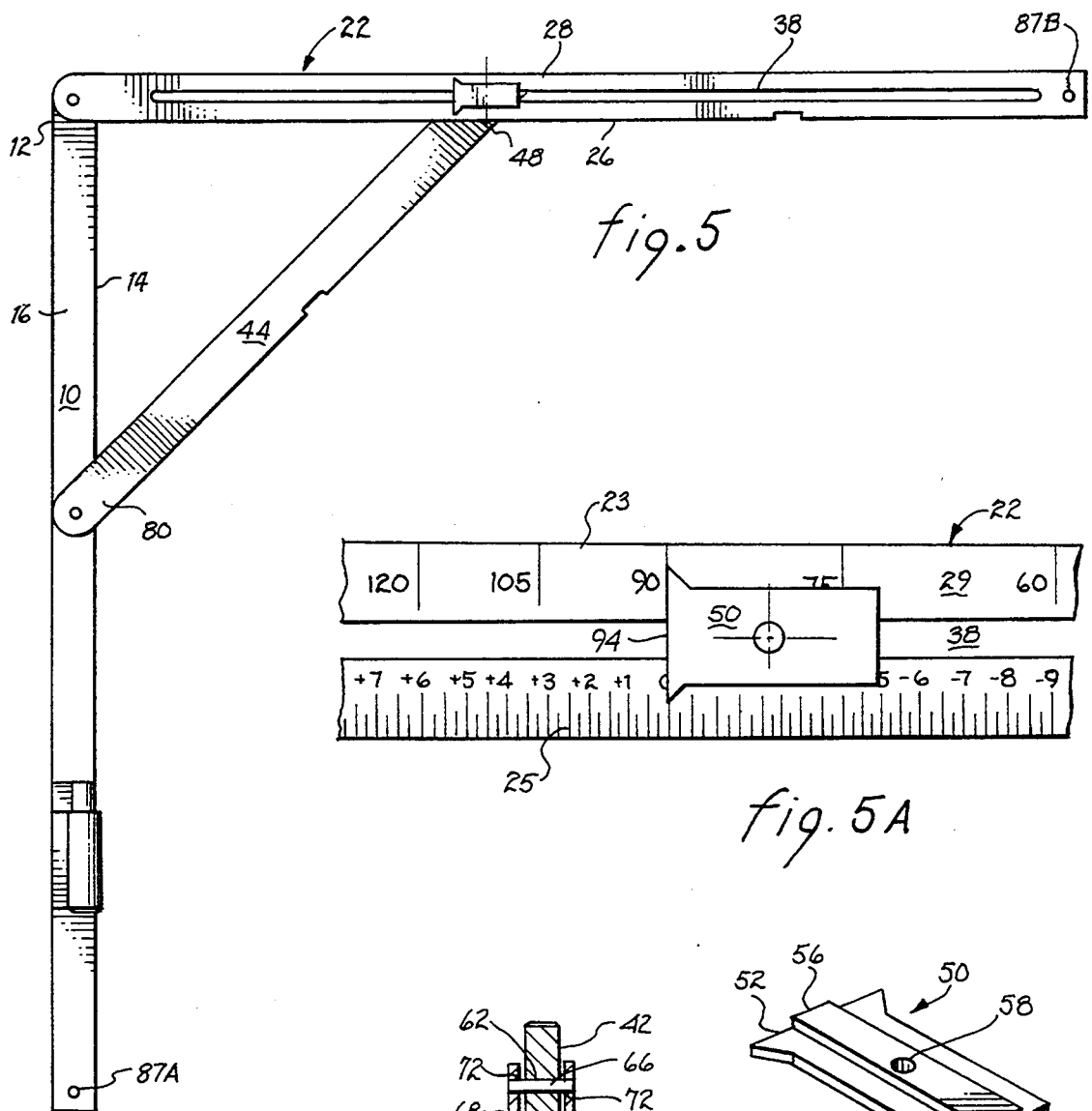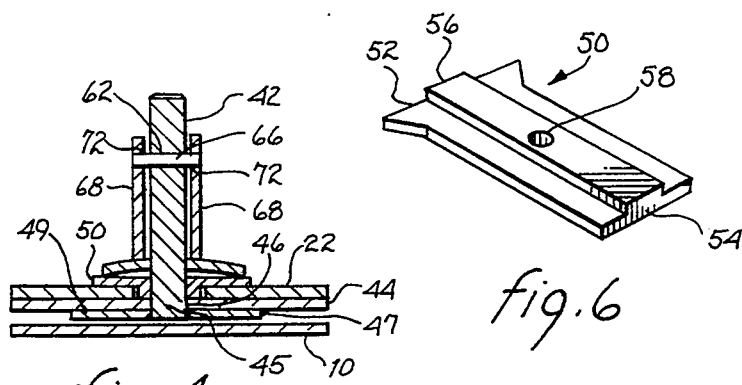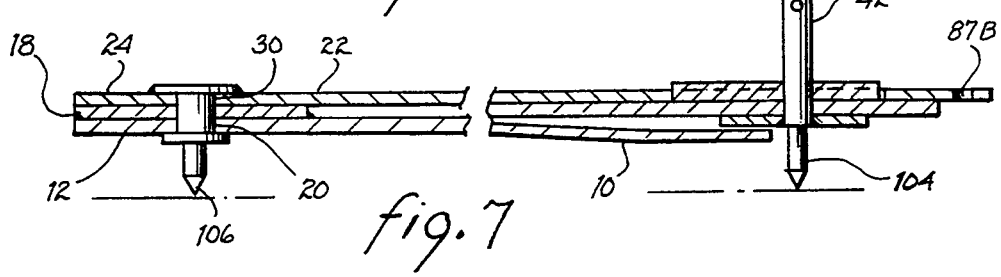

PORTABLE TEMPLET AND METHOD THEREFOR

BACKGROUND OF THE INVENTION

1. Field of Invention

This invention relates to angle measuring devices and methods therefor and, more particularly, to devices and methods therefor for maintaining straight edges at a desired angle with each other.

2. Description of Prior Art

In the construction of a structure, such as a house, it is often necessary to cut a building material at an angle that differs from 90 degrees. This typically occurs when the building material is cut to fit within an existing portion of the house.

When, for example, the house has a cathedral ceiling, it may be desirable to cut an interior wall from a building material, such as sheetrock, to have edges that abut the ceiling. To determine the angle for cutting the sheetrock, a carpenter usually climbs a ladder to the ceiling and constructs a crude templet by nailing boards together at an angle formed by intersecting halves of the ceiling. The templet is then used to aid in the drawing of guidelines on the sheetrock. The carpenter cuts the sheetrock along the guidelines to thereby form the interior wall.

The construction of the templet is inconvenient, expensive and frequently imprecise. Heretofore, there has not been a convenient and economic templet useful in cutting a building material at a desired angle.

Prior art known to Applicant is as follows:

| U.S. Pat. No. | Inventor | Date filed | Date issued |
|---|---|---|---|
| 745,767 | Berkley | 10/06/02 | 12/1/03 |
| 1,198,969 | Stevens | 3/15/16 | 9/19/16 |
| 822,094 | Zimmer | 10/4/05 | 5/29/06 |
| 2,641,842 | Porter, Jr. | 11/2/51 | 6/16/53 |
| 4,866,853 | Braden | 3/21/88 | 9/19/89 |
| 3,899,750 | Becroft | 8/19/57 | 8/18/59 |
| 1,594,097 | Histand | 4/10/24 | 7/27/26 |
| 785,329 | Rasmussen | 11/21/04 | 3/21/05 |
| 4,769,920 | O'Conner, Jr. | 4/20/87 | 9/13/88 |

None of the above cited references, when viewed alone or in combination, either anticipate or render obvious Applicant's claimed invention.

SUMMARY OF THE INVENTION

An object of the present invention is to provide an improved templet device and method for cutting materials at a desired angle.

Another object of the present invention is to provide an improved templet device and method for cutting building materials at an angle determined by elements of a structure.

BRIEF DESCRIPTION OF A PREFERRED EMBODIMENT

According to one embodiment of this invention, a portable templet device is provided comprising a scaled straight edge and an unscaled straight edge. An end of the scaled straight edge and an end of the unscaled straight edge are pivotally connected. The scaled straight edge has a longitudinal slot wherein a stem is maintained by a compression lock having a bearing therein. The stem passes through a hole in one end of a flat connecting bar that is disposed between the bearing of the compression lock and the scaled straight edge. The other end of the connecting bar is pivotally connected to the unscaled straight edge. When the compression lock is open, the stem is slidable within the slot. When the compression lock is closed, the position of the stem is fixed within the slot. The templet in accordance with the present invention has straight edges that are easily made to sustain a desired angle. The straight edges may be used as a guide for cutting a building material.

Other objects, features, and advantages of the present invention will be apparent from the following description of the preferred embodiment thereof as illustrated in the accompanying drawing.

BRIEF DESCRIPTION OF THE DRAWING

FIG. 1 is a perspective view of the preferred embodiment of the present invention where straight edges of a template are locked in a position to render the template suitable for carrying;

FIG. 2 is a perspective view of the embodiment of FIG. 1 with an open compression lock;

FIG. 2A is an exploded view of a portion of FIG. 2;

FIG. 3 is section of FIG. 1 taken along the line 3—3;

FIG. 4 is a section of FIG. 3 taken along the line 4—4;

FIG. 5 is a plan view of the preferred embodiment where straight edges thereof form a 90 degree angle;

FIG. 5A is an enlargement of a portion of FIG. 5;

FIG. 6 is a perspective view of a vernier plate of the preferred embodiment; and FIG. 7 is a section of a side elevation of an alternative embodiment of the present invention where a cutting bit and a compass point are included;

DESCRIPTION OF THE PREFERRED EMBODIMENT

As shown in FIGS. 1–6, a templet in this embodiment includes an unscaled generally rectangular maleable sheet steel straight edge 10 having a distal end 12 and parallel longitudinal edges 14, 16. End 12 is fixedly connected to a substantially flat bearing plate 18 by welding or in any other suitable manner. End 12 and bearing plate 18 have a cylindrical hole 20 (FIG. 3) therethrough with the axis of hole 20 perpendicular to edges 14, 16.

A scaled generally rectangular maleable sheet steel straight edge 22 has a distal end 24 and parallel longitudinal edges 26, 28. As best shown in FIG. 5A, straight edge 22 has a surface 29 whereon a scales 23, 25 are engraved. In an alternative embodiment, surface 29 may carry scales that are glued thereto. Scales 23, 25 are more fully described hereinafter.

End 24 has a cylindrical hole 30 therethrough with the axis of hole 30 substantially perpendicular to edges 26, 28. Holes 20, 30 have similar diameters.

Straight edges 10, 22 are disposed with holes 20, 30 in coaxial alignment. The disposition of straight edges 10, 22 is maintained by a pin 32 that passes through holes 20, 30.

Pin 32 has a flat head 34 on one end (FIG. 3) that is fixedly connected to end 12 by welding or in any other suitable manner. The diameter of head 34 exceeds the diameter of holes 20, 30.

Additionally, pin 32 has a flat head 36, similar to head 34 on its other end to maintain opposing surfaces of end 24 in slidable contact with bearing plate 18 and head 36, respectively. Because of the slidable contact, straight edges 10, 22 are in a pivotal relationship whereby straight edge 10 is rotatable with respect to straight edge 22 about the axes of holes 20, 30.

Straight edge 22 has a longitudinal slot 38 (FIGS. 2 and 5) therethrough substantially midway between edges 26, 28. Slot 38 extends from end 24 to a proximal end 40 of straight edge 22.

Within slot 38 is a stem 42 that connects straight edge 22 to a connecting bar 44. More particularly, stem 42 passes through a hole 46 (FIG. 4) near an end 48 of connecting bar 44. Connecting bar 44 is more fully described hereinafter.

An end 45 of stem 42 is fixedly connected to the center of a disc shaped bearing 47 that has a bearing surface 49 in slidable contact with a surface of connecting bar 44. As explained hereinafter, bearing 47 is an element of a compression lock that is operable to fix the position of stem 42 within slot 38.

A vernier plate 50 (FIG. 6), of a generally rectangular shape, has a trapezoidal end section 52 and a squared end 54. A raised rectangular center portion 56 of vernier plate 50 is of substantially the same thickness as straight edge 22. Additionally, the approximate middle of central portion 50 has a hole 58 therethrough. Holes 46, 58 have similar diameters.

Center portion 56 fits within slot 38. In this embodiment, vernier plate 50 is oriented with end 52 closest to end 24. Correspondingly, end 54 is closest to end 40.

Stem 42 passes through hole 58 thereby maintaining holes 46, 58 in coaxial alignment. Accordingly, the location of stem 42 within slot 38 determines the location of vernier plate 50 on straight edge 22. As explained hereinafter the location of stem 42 within slot 38 uniquely determines the angle sustained by straight edges 10, 22. Additionally, an edge of end section 52 provides a scale indication of the size of the sustained angle.

Stem 42 additionally passes through a central hole of a conical washer 60 that is disposed with its flat face upon vernier plate 50. When a locking force presses against the arcuate side of washer 60 in a direction of an arrow 61 and causes stem 42 to pull bearing 47 in a direction opposite from that indicated by arrow 61, center portion 56 and connecting bar 44 are correspondingly compressed. The compression fixes the position of stem 42 within slot 38. Conical washers are well known to those skilled in the art.

Stem 42 has a hole 62 therethrough (FIG. 4), near an end 64 thereof. Hole 62 has an axis that perpendicularly intersects the axis of stem 42. Within hole 62 a pin 66 is rotatably retained.

Stem 42 is sandwiched between a pair of parallel locking plates 68 that each have three 90 degree corners and an arcuate corner 70. Additionally, locking plates 68 each have a hole 72 wherein respective ends of pin 66 are fixedly connected. Ends 74 of locking plates 68 are fixedly connected to a handle 76 (FIG. 3) by welding or in any other suitable manner.

In this embodiment, the displacement of pin 66 from arcuate corners 70 is greater than the displacement of pin 66 from edges 78 of locking plates 68. Accordingly, when handle 76 is positioned to cause edges 78 to contact washer 60, stem 42 is slidable within slot 38. However, when handle 76 is positioned to cause arcuate corners 70 to contact washer 60, the displacement of pin 66 from arcuate corners 70 provides the locking force which results in the fixing of the position of stem 42 within slot 38.

From the explanation given hereinbefore, handle 76, locking plates 68, pin 62, stem 42, washer 60 and bearing 47 are all elements of a compression lock. The compression lock is open when handle 76 is positioned to cause edges 70 to contact washer 60. The lock is closed when handle 76 is positioned to cause arcuate corners 70 to contact washer 60.

Connecting bar 44, referred to hereinbefore, is of a generally rectangular shape and made from a maleable sheet steel. An end portion 80 (FIG. 2A) of connecting bar 44 has a hole 82 therethrough midway between side edges of connecting bar 44. A pin 84 is fixedly connected to connecting bar 44 within hole 82.

Pin 84 passes through a hole 86 through straight edge 10 midway between edges 14,16. Pin 84 causes connecting bar 44 and straight edge 10 to be disposed with holes 82, 86 in coaxial alignment. Additionally, a pin 84 passes through a washer 88 disposed between straight edge 10 and end portion 80.

Accordingly, straight edge 10 and one face of washer 88 are in slidable contact. Similarly, end portion 80 and the other face of washer 88 are in slidable contact. The slidable contact is maintained by a head 90 on pin 84 that has a diameter larger than the diameters of holes 82, 86. Because of the slidable contact, connecting bar 44 and straight edge 10 are in a pivotal relationship whereby straight edge 10 is rotatable with respect to connection bar 44 about the axes of holes 82, 86.

According to the present invention, connecting bar 44 is maintained against pivoting when closure of the compression lock causes stem 42 to be in a fixed position thereby causing straight edges 10, 22 to sustain a fixed angle. When the compression lock is open, stem 42 is slidable within slot 38, thereby providing an adjustable angle between straight edges 10, 22.

Preferably, straight edges 10, 22 have holes 87A, 87B, respectively, therethrough where either a compass point or a cutting tool may be mounted. Holes 87A, 87B preferably have a ⅜ inch diameter Preferably, the displacement between pins 32, 84 is in accordance with a relationship which is given as:

$$L = 0.707\ C$$

where

C is the displacement between pin 84 and stem 42; and

L is the displacement between pins 32, 84

Preferably, the displacement from pin 84 to an end 92 of straight edge 10 is greater the length of connecting bar 44.

An edge 94 (FIG. 5A) of vernier plate 50 is used to provide an indication on scales 23, 25 of an angle sustained by straight edges 10, 22. Scale 23 provides a true indication of the sustained angle. Scale 25 provides an indication of the sustained angle being intermediate to those indicated on scale 23. Polarity markings on scale 25 indicate whether the sustsined angle is greater than or less than ninety degrees. A plus sign, for example, indicates that the sustained angle is greater than ninety degrees. conversely, a minus sign indicates that the sustained angle is less than ninety degrees.

A handle 96 (FIGS. 1 and 2), similar to handle 76 is connected to straight edge 10 via an angle bracket 98. Handle 96 is used to aid in positioning the templet to determine an angle between elements of a structure or in any other manipulation of the templet. Additionally, connecting bar 44 and straight edge 22 have notches 100, 102, respectively, that receive a part of bracket 98 when straight edges 10, 22 are rotated to a position suitable for portability of the templet (FIG. 1).

As shown in FIG. 7, in an alternative embodiment, a cutting bit 104 is fixedly connected to stem 42. Additionally, a compass point 106 is fixedly connected to pin 32. Cutting bit 104 is rotatable about point 106 to make an arcuate cut in a building material at a selected radius.

The description of the preferred embodiment is given herein by way of example. Changes in form and detail may be made by those skilled in the art without departing from the spirit and scope of the present invention as defined by the following claims.

What is claimed is:

1. A templet for indicating a desired angle, comprising:
   a first straight edge of a generally rectangular shape;
   a second straight edge of a generally rectangular shape having an end rotatably connected to an end of said first straight edge, thereby defining a first pivot about which said first and second straight edges are rotatable;
   a connecting bar having one end rotatably connected to said second straight edge, thereby defining a second pivot about which said second straight edge and said connecting bar are rotatable; and
   means for locking the other end of said connecting bar at a location on said first straight edge; said first straight edge has a longitudinal slot therethrough and said connecting bar has a hole therethrough near its other end, said locking means comprising:
   a vernier plate, of generally rectangular shape, having a center portion that fits within said slot, said center portion having a hole therethrough;
   a cylindrical stem;
   a bearing connected to one end of said stem, said connecting bar being between said center portion and said bearing with said stem passing through said holes; and
   means for applying a locking force that compresses said center portion and said connecting bar against said bearing.

2. A template in accordance with claim 1 wherein said straight edges and said connecting bar are made from a maleable steel sheet.

3. A template in accordance with claim 1 wherein said straight edges each have a hole therethrough for mounting a tool.

4. A template in accordance with claim 1 wherein the displacement between said first and second pivots is in accordance with a relationship which is given as:

$$L = 0.707 \, C$$

where

L is the displacement between said first and second pivots; and

C is the displacement between said cylindrical stem and said second pivot.

5. A template in accordance with claim 1 wherein said first straight edge carries a scale thereon and an edge of said vernier plate provides a scale indication of an angle sustained by said straight edges.

6. A template in accordance with claim 1 wherein said means for applying comprises:
   a conical washer disposed with its flat face upon said vernier plate, said stem passing through the central hole of said washer;
   a pin axially rotatable within a hole in said stem that perpendicularly intersects the axis of said stem;
   a locking plate, of a generally rectangular shape with an arcuate corner, fixedly connected to said pin with the displacement between said pin and said arcuate corner being greater than the displacement between said pin and an edge of said locking plate, rotation of said pin alternatively causing said edge and said arcuate corner to contact said washer; and
   means for rotating said pin.

7. A templet in accordance with claim 6 wherein said means for rotating comprises a handle connected to said locking plate.

8. In the method of providing an indication of an angle sustained by first and second straight edges, both of a generally rectangular shape, the steps of:
   rotatable connecting an end of said first straight edge to an end of said second straight edge;
   rotatably connecting one end of a connecting bar to said second straight edge; and
   locking the other end of said connecting bar at a location on said first straight edge that causes said straight edges to sustain a desired angle; said first straight edge has a longitudinal slot therethrough and said connecting bar has a hole therethrough near its other end, said locking comprising:
   a vernier plate, of generally rectangular shape, having a center portion that fits within said slot, said center portion having a hole therethrough;
   a cylindrical stem;
   a bearing connected to one end of said stem, said connecting bar being between said center portion and said bearing with said stem passing through said holes; and
   means for applying a locking force that compresses said center portion and said connecting bar against said bearing.

9. The method of claim 8 including the additional step of providing on said first straight edge as an indication of an angle sustained by said straight edges.

* * * * *